United States Patent
Chai et al.

(10) Patent No.: US 10,024,422 B2
(45) Date of Patent: Jul. 17, 2018

(54) METHOD FOR CONTROLLING LOCK-UP CLUTCH OF AUTOMATIC TRANSMISSION

(71) Applicant: HYUNDAI MOTOR COMPANY, Seoul (KR)

(72) Inventors: Min Jae Chai, Suwon-si (KR); Se Hwan Jo, Bucheon-si (KR); Kyung Moo Lee, Yongin-si (KR); Chang Wook Lee, Suwon-si (KR); Won Ho Kim, Incheon (KR); Bong Uk Bae, Daegu (KR); Jin Young Hwang, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 196 days.

(21) Appl. No.: 15/257,263

(22) Filed: Sep. 6, 2016

(65) Prior Publication Data

US 2017/0307070 A1 Oct. 26, 2017

(30) Foreign Application Priority Data

Apr. 20, 2016 (KR) .................. 10-2016-0048013

(51) Int. Cl.
*F16H 61/14* (2006.01)
*F16H 63/46* (2006.01)
*F16H 61/06* (2006.01)

(52) U.S. Cl.
CPC ......... *F16H 61/143* (2013.01); *F16H 61/061* (2013.01); *F16H 63/46* (2013.01);
(Continued)

(58) Field of Classification Search
CPC ............... F16H 61/143; F16H 61/061; F16H 2061/146; Y10T 477/635; Y10T 477/6351;
(Continued)

(56) References Cited

U.S. PATENT DOCUMENTS 5,879,266 A 3/1999 Sawamura et al.
8,498,791 B2 * 7/2013 Muto .................. F16H 59/20
475/157

(Continued)

FOREIGN PATENT DOCUMENTS

JP H09-79370 A 3/1997
JP 4693703 B2 6/2011

(Continued)

OTHER PUBLICATIONS

Korean Notice of Allowance dated Feb. 23, 2018 from the corresponding Korean Application No. 10-2016-0048013, 6 pp.

(Continued)

*Primary Examiner* — Roger L Pang

(74) *Attorney, Agent, or Firm* — Brinks Gilson & Lione

(57) ABSTRACT

The present disclosure relates to a method for controlling a lock-up clutch of an automatic transmission. The method includes: a detecting step of detecting, by a controller, a current signal applied to a solenoid valve of an engaging element when a gear change operation begins; and a first increasing control step of controlling, by the controller, an amount of current that is applied to a solenoid valve of a lock-up clutch during an initial fill time period when it is determined that the current signal is applied to the solenoid valve of the engaging element. In particular, the solenoid valve of the engaging element is used to form a gear stage, and the controller increases the amount of current to a predetermined level for a predetermined period of time.

6 Claims, 3 Drawing Sheets

(52) U.S. Cl.
CPC ..... *F16H 2061/146* (2013.01); *Y10T 477/635* (2015.01); *Y10T 477/641* (2015.01); *Y10T 477/735* (2015.01)

(58) Field of Classification Search
CPC ......... Y10T 477/63525; Y10T 477/641; Y10T 477/6414; Y10T 477/735
See application file for complete search history.

(56) References Cited

U.S. PATENT DOCUMENTS

| | | |
|---|---|---|
| 9,447,872 B2 * | 9/2016 | Sato ..................... F16H 61/143 |
| 2010/0167871 A1 | 7/2010 | Inagaki et al. |
| 2011/0230308 A1 | 9/2011 | Inoue et al. |

FOREIGN PATENT DOCUMENTS

| | | |
|---|---|---|
| JP | 2011-241963 A | 12/2011 |
| JP | 2013-133878 A | 2/2013 |
| KR | 10-1998-017084 A | 6/1998 |
| KR | 10-1998-053905 A | 9/1998 |
| KR | 10-2010-0088817 | 8/2010 |
| KR | 10-2011-0011435 | 2/2011 |
| KR | 10-2014-0032178 | 3/2014 |
| KR | 10-2014-0038220 | 3/2014 |
| KR | 10-2015-0071486 | 6/2015 |
| WO | 2013/035398 | 3/2013 |

OTHER PUBLICATIONS

Korean Office Action dated Aug. 21, 2017 from the corresponding Korean Patent Application No. 10-2016-0048013, 4 pp.

* cited by examiner

METHOD FOR CONTROLLING LOCK-UP CLUTCH OF AUTOMATIC TRANSMISSION

CROSS REFERENCE TO RELATED APPLICATION

The present application claims priority to and the benefit of Korean Patent Application No. 10-2016-0048013, filed Apr. 20, 2016, which is incorporated herein by reference in its entirety.

FIELD

The present disclosure relates generally to a method of controlling a lock-up clutch of an automatic transmission.

BACKGROUND

The statements in this section merely provide background information related to the present disclosure and may not constitute prior art.

High global oil prices, fuel efficiency due to CO2 regulations, and eco-environment concerns are important considerations in vehicle development. In order to achieve these goals, Automobile manufacturers are devoting their efforts into developing technologies to improve fuel efficiency.

It is important to reduce power loss of an automatic transmission to improve the fuel efficiency of a vehicle. In particular, it is important to reduce power loss of a torque converter.

Power loss of the torque converter always occurs since the torque converter of the automatic transmission transfers the power using oil, and a lock-up clutch system is used to supplement this weakness and to improve the efficiency. Hence, it has been developed in direction to expand operating area of the lock-up clutch to improve efficiency of the entire driving of vehicle. A typical example of the lock-up clutch is a 3-way separate chamber multi-plate clutch.

However, since the operating area of the lock-up clutch is expanded, a precise slip control is desired. In particular, we have discovered that an excellent gear change feel of the vehicle is desired.

Meanwhile, the gear change operation of the automatic transmission is performed by selectively engaging or releasing friction elements, the friction elements including a plurality of clutches and a brake.

For example, when three clutches are provided as friction factors, a desired gear change may be achieved by simultaneously releasing the second clutch and engaging the third clutch, while maintaining the engaged first clutch. Herein, the lock-up clutch absorbs gear change impact transferred to the vehicle by performing precise slip control and maintaining the pressure at a low level.

However, we have discovered that in the conventional art, when the control pressure of the lock-up clutch is only controlled to be maintained at a low level, some problems occur as described below.

First, an amount of oil in a pump is consumed equal to the volume of the third clutch, during an initial fill time period when the third clutch is operated and then the amount of oil in the lock-up clutch is reduced momentarily. Thus, pressure reduction occurs in the lock-up clutch, which causes impact to the vehicle.

Second, when the gear change operation is ended according to the engagement and release of the clutches, pressure of the third clutch is raised up to a line pressure. In this case, like the first problem, the amount of oil in the lock-up clutch is reduced equal to the amount of oil flowing into the third clutch. Thus, the pressure of the lock-up clutch is reduced, which also causes impact to the vehicle.

The foregoing is intended merely to aid in the understanding of the background of the present disclosure, and is not intended to mean that the present disclosure falls within the purview of the related art that is already known to those skilled in the art.

SUMMARY

The present disclosure proposes a method of controlling a lock-up clutch of an automatic transmission, in which control operational stability of the lock-up cultch is improved even when an amount of oil in a pump is consumed due to a gear change operation.

In one form, the method for controlling a lock-up clutch of an automatic transmission includes: a detecting step of detecting, by a controller, a current signal applied to a solenoid valve of an engaging element when a gear change operation begins, the solenoid valve of the engaging element being used to form a gear stage, and a first increasing control step of controlling, by the controller, an amount of current that is applied to a solenoid valve of a lock-up clutch during an initial fill time period when it is determined that the current signal is applied to the solenoid valve of the engaging element, wherein the controller controls the amount of current by increasing the amount of current to a predetermined level for a predetermined period of time.

In the first increasing control step, the increased amount of current applied to the solenoid valve of the lock-up clutch and the predetermined period of time in which the amount of current is increased may be determined by a first map data that forms a relationship between an oil temperature, a target gear stage, and an engine rpm.

In the first increasing control step, the amount of current applied to the solenoid valve of the lock-up clutch may be controlled by increasing the amount of current after the current signal is applied to the solenoid valve of the engaging element.

The method may further include, after the first increasing control step: a second increasing control step of controlling, by the controller, an amount of current that is applied to the solenoid valve of the lock-up clutch when it is determined that the gear change operation is ended by applying a current signal that is equal to or greater than a preset value to the solenoid valve of the engaging element, wherein the controller may control the amount of current by increasing the amount of current to a predetermined level for a predetermined period of time.

In the second increasing control step, the increased amount of current applied to the solenoid valve of the lock-up clutch and the predetermined period of time in which the amount of current is increased may be determined by a second map data that forms a relationship between an oil temperature, a target gear stage, and an engine rpm.

In the second increasing control step, the controller may control the amount of current of the solenoid valve of the lock-up clutch by increasing the amount of current, and simultaneously applies the current signal, which is equal to or greater than the preset value, to the solenoid valve of the engaging element.

Accordingly, the present disclosure improves gear change control stability of a lock-up cultch by inhibiting or preventing pressure reduction in the lock-up clutch by properly compensating for the reduced amount of oil in the lock-up clutch, which is caused by the amount of oil consumed by an engaging element during an initial fill time period when a gear change operation starts. The present disclosure also properly compensates for the reduction in the amount of oil in the lock-up clutch, which is caused by the amount of oil consumed by the engaging element at the end of the gear change operation, thereby inhibiting or preventing pressure reduction in the lock-up clutch and further improving gear change control stability.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
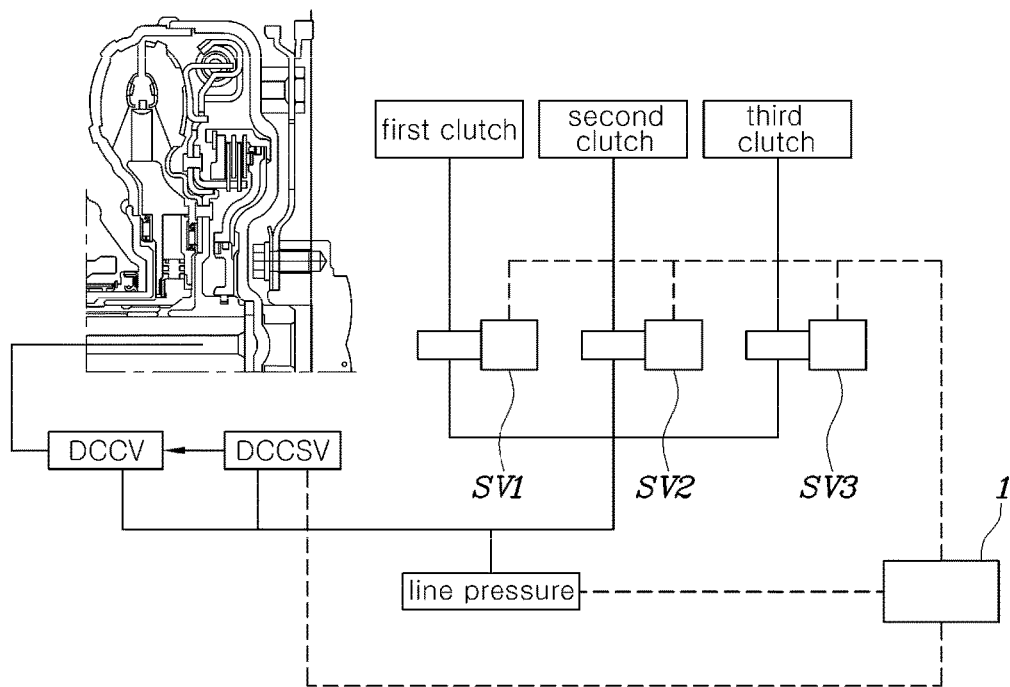
FIG. 1 is a schematic view illustrating an oil pressure control configuration of an automatic transmission which is applicable to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A method of controlling a lock-up clutch of an automatic transmission may be configured to include a detecting step and a first increasing control step.

The present disclosure will be described in detail with reference to FIGS. 2 and 3. First, in the detecting step, a controller 1 may detect a current signal that is applied to a solenoid valve SV1, SV2, SV3 of an engaging element when a gear change operation starts, the solenoid valve of the engaging element being used to form a gear stage.

Here, the engaging element may be a clutch or a brake constituting friction elements of the automatic transmission, in which the clutch or the brake performs an engaging operation to form a target gear stage during a gear change operation. A release element shown in FIG. 3 may be a clutch or a brake that performs a release operation to form a target gear stage during a gear change operation. The engaging element and the release element may be changed according to the requirement of the friction elements for performing a gear change operation to realize a target gear stage.

In one form of present disclosure, an automatic transmission that is provided with three clutches as shown in FIG. 1 is illustrated and described. For convenience of the description, the third clutch among the three clutches is illustrated as the engaging element, and second clutch is illustrated as the release element which will be described later.

Figure 2:
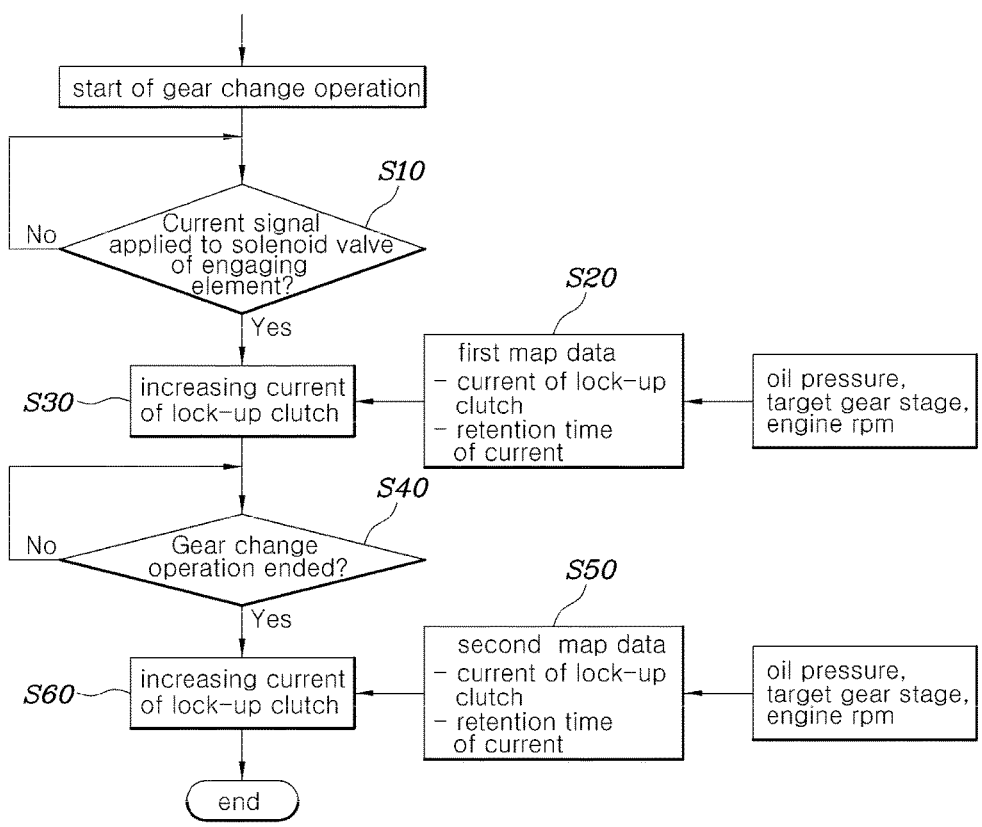
FIG. 2 is a flow chart explaining a control flow of a lock-up clutch according to the present disclosure.
Figure 3:
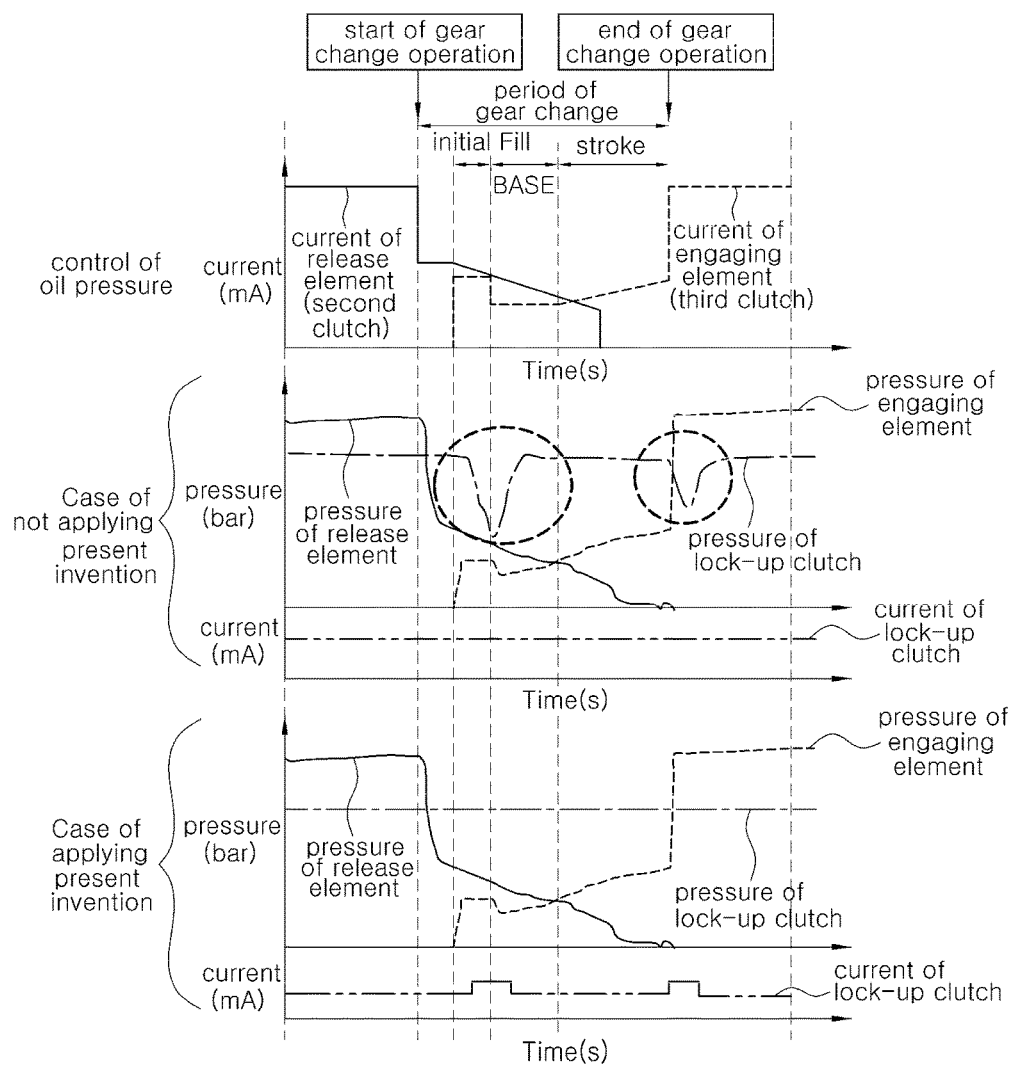
FIG. 3 is a graph showing an oil pressure behavior of the lock-up clutch by comparing results obtained when a control of the lock-up clutch according to the present disclosure is applied or not.

In addition, in the first increasing control step shown in FIGS. 2 and 3, when the current signal is applied to the solenoid valve SV3 of the engaging element (i.e., the third clutch), the controller 1 may control the amount of current that is applied to a solenoid valve of a lock-up clutch DCCSV during an initial fill time period of the engaging element. Here, the controller may control the amount of current by increasing the amount of current to a predetermined level for a predetermined lengthy period of time.

In other words, when a gear change operation starts, the second clutch (release element) is released to perform the gear change operation for realizing a target gear stage and the third clutch (engaging element) is simultaneously engaged; then, the current signal is input to a solenoid valve SV3 of the third clutch to control the oil pressure of the third clutch, and, an amount of current, which is equal to or greater than a predetermined amount of current, is simultaneously applied to the solenoid valve of the lock-up clutch to control the oil pressure of the lock-up clutch.

Thus, when the gear change operation starts, the amount of current of the solenoid valve of the lock-up clutch DCCSV is controlled by momentarily increasing the amount of current when the third clutch is engaged. Therefore, a reduction in the amount of oil in the lock-up clutch, which is caused by the oil consumption of the third clutch during the initial fill time period, is compensated. Thus, gear change control stability is realized by inhibiting or preventing pressure reduction in the lock-up clutch.

Referring to FIG. 2, in the first increasing control step, the increased amount of current applied to the solenoid valve of the lock-up clutch and the predetermined lengthy period of time in which the amount of current is increased may be determined by first map data that forms a relationship between an oil temperature, a target gear stage and/or a present gear stage, and an engine rpm.

In other words, the first map data, which compensates for an oil pressure reduction of the lock-up clutch in certain engine conditions, forms a relationship between a minimum amount of increased current and a lengthy period of time in which the amount of current is increased. By using the first map data, the pressure of the lock-up clutch may be stably controlled.

Also, as shown in FIG. 3, in the first increasing control step of the present disclosure, the controller 1 may control the amount of current that is applied to the solenoid valve of the lock-up clutch DCCSV by increasing the amount of current to a predetermined level after the current signal is applied to the solenoid valve SV3 of the engaging element.

In other words, the current signal is applied to the solenoid valve SV3 of the engaging element, and then, with a predetermined delay time, the controller controls the current of the solenoid valve of the lock-up clutch DCCSV. Therefore, the amount of oil in the lock-up clutch is increased before oil is consumed by the third clutch during the initial fill time period. A risk, in which the pressure of the lock-up clutch is increased, is inhibited or prevented.

Meanwhile, referring to FIGS. 2 and 3, after the first increasing control step, when the gear change operation is ended by applying a current signal, which is equal to or greater than a preset value, to the solenoid valve SV3 of the engaging element, the controller 1 may further include a second increasing control step which controls the amount of current applied to the solenoid valve of the lock-up clutch by increasing the amount of current to a predetermined level for a predetermined lengthy period of time.

In other words, when the gear change operation starts, in order to engage the third clutch (engaging element) by increasing its pressure up to a line pressure, the controller 1 applies the current signal, which is equal to or greater than the preset value, to the solenoid valve SV3 of the third clutch to control the oil pressure of the third clutch. Then, the controller 1 instantaneously applies the current, which is equal to or greater than the preset value, to the solenoid valve of the lock-up clutch in order to control the oil pressure of the lock-up clutch.

Therefore, when the gear change operation is ended at the time that the pressure of the third clutch is raised up to the line pressure, the controller 1 controls the amount of oil in the lock-up clutch by simultaneously increasing the amount of current applied to the solenoid valve of the lock-up clutch. Then, the reduction in the amount of oil in the lock-up clutch due to the oil consumption of the third clutch at the end period of the gear change operation is compensated. Therefore, gear change control stability is improved by inhibiting or preventing the pressure reduction of the lock-up clutch.

In addition, in the second increasing control step, the increased amount of current applied to the solenoid valve of the lock-up clutch DCCSV and the predetermined lengthy period of time may be determined by second map data which forms a relationship between an oil temperature, a target gear stage, and an engine rpm.

In other words, the second map data, which can compensate the oil pressure reduction of the lock-up clutch in certain engine condition, forms a relationship between minimum amount of increased current and lengthy period of time in which the amount of current is increased. By using the second map data, the pressure of the lock-up clutch may be stably controlled.

Also, referring to FIG. 3, in the second increasing control step, the controller 1 controls the amount of current applied to the solenoid valve of the lock-up clutch by increasing the amount of current, simultaneously with application of the current signal, which is equal to or greater than the preset value, to the solenoid valve of the engaging element.

In the following, a control flow of the lock-up clutch according to the present disclosure is described.

Referring to FIG. 2, when a gear change operation is performed to change the gear stage from a present gear stage to a target gear stage according to a driving condition of a vehicle, a step S10 detects whether an initial current signal is applied to the solenoid valve SV3 of the engaging element (e.g., third clutch).

When the initial current signal is applied to the solenoid valve SV3 of the engaging element, a step S20 determines by use of the first map data an amount of increased current and a lengthy period of time in which the amount of current is increased, both of which are used to control the current of the lock-up clutch. A step S30 controls the current of the solenoid valve of the lock-up clutch DCCSV by increasing the amount of current to the determined increased amount of current for the determined lengthy period of time in which the amount of current is increased. Hence, a pressure reduction of the lock-up clutch during an initial fill time period of the engaging element is inhibited or prevented.

Further, S40 determines whether the gear change operation is ended by detecting a current signal, which is equal to or greater than a preset value, in the solenoid valve SV3 of the engaging element.

When the current signal, which is equal to or greater than the preset value, is applied to the solenoid valve SV3 of the engaging element, a step S50 determines, by using a second map data, an amount of increased current and a lengthy period of time of the increased current, which are both used to control the current of the lock-up clutch. A step S60 controls the current of the solenoid valve of the lock-up clutch DCCSV by increasing the amount of current to the determined increased amount of current for the determined lengthy period of time in which the amount of current is increased. Hence, a pressure reduction of the lock-up clutch during the period, in which the pressure of the engaging element is increased at the end of the gear change operation, is inhibited or prevented As described above, according to the present disclosure, when the gear change operation starts, the reduction in the amount of oil in the lock-up clutch, which is caused by the oil consumption of the third clutch during the initial fill time period, is properly compensated, and therefore, gear change control stability is improved by inhibiting or preventing the pressure reduction of the lock-up clutch. Also, the reduction in the amount of oil in the lock-up clutch, which is caused by the oil consumption occurring when operating the third clutch at the end period of the gear change operation of the third clutch, is inhibited or prevented, and therefore, gear change control stability is improved by inhibiting or preventing the pressure reduction of the lock-up clutch.

Although one form of the present disclosure has been described for illustrative purposes, those skilled in the art will appreciate that various modifications, additions and substitutions are possible, without departing from the scope and spirit of the present disclosure as disclosed above.

What is claimed is:

1. A method for controlling a lock-up clutch of an automatic transmission, the method comprising:
    a detecting step of detecting, by a controller, a current signal applied to a solenoid valve of an engaging element when starting a gear change operation, the solenoid valve of the engaging element being used to form a gear stage, and
    a first increasing control step of increasing, by the controller, an amount of current that is applied to a solenoid valve of a lock-up clutch during an initial fill time period when the current signal is applied to the solenoid valve of the engaging element, wherein the controller increases the amount of current to a predetermined level for a predetermined period of time.

2. The method of claim 1, wherein in the first increasing control step, the increased amount of current applied to the solenoid valve of the lock-up clutch and the predetermined period of time in which the amount of current is increased are determined by a first map data that forms a relationship between an oil temperature, a target gear stage, and an engine rpm.

3. The method of claim 1, wherein in the first increasing control step, the amount of current applied to the solenoid valve of the lock-up clutch is increased by the controller after the current signal is applied to the solenoid valve of the engaging element.

4. The method of claim 1, further comprising
    a second increasing control step, performed by the controller after the first increasing control step, wherein the second increasing control step controls an amount of current applied to the solenoid valve of the lock-up clutch when the gear change operation is ended by applying the current signal that is equal to or greater than a preset value to the solenoid valve of the engaging element, wherein the controller increases the amount of current applied to the solenoid valve of the lock-up clutch to a predetermined level for a predetermined period of time.

5. The method of claim 4, wherein in the second increasing control step, the increased amount of current applied to the solenoid valve of the lock-up clutch and the predetermined period of time in which the amount of current applied to the solenoid valve of the lock-up clutch is increased are determined by a second map data that forms a relationship between an oil temperature, a target gear stage, and an engine rpm.

6. The method of claim 4, wherein in the second increasing control step, the controller controls the amount current of the solenoid valve of the lock-up clutch by increasing the amount of current, and simultaneously applies the current signal, which is equal to or greater than the preset value, to the solenoid valve of the engaging element.

* * * * *